(12) United States Patent
Thomaschewski

(10) Patent No.: US 10,144,516 B2
(45) Date of Patent: Dec. 4, 2018

(54) FLOOR ATTACHMENT ASSEMBLY AND AIRCRAFT SEAT

(71) Applicant: Lufthansa Technik AG, Hamburg (DE)

(72) Inventor: Oliver Thomaschewski, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 181 days.

(21) Appl. No.: 15/025,499

(22) PCT Filed: Sep. 26, 2014

(86) PCT No.: PCT/EP2014/070609
§ 371 (c)(1),
(2) Date: Mar. 28, 2016

(87) PCT Pub. No.: WO2015/044338
PCT Pub. Date: Apr. 2, 2015

(65) Prior Publication Data
US 2016/0214719 A1 Jul. 28, 2016

(30) Foreign Application Priority Data
Sep. 27, 2013 (DE) .................. 10 2013 219 616

(51) Int. Cl.
*B64D 11/00* (2006.01)
*B64D 11/06* (2006.01)

(52) U.S. Cl.
CPC .......... *B64D 11/0696* (2013.01); *Y02T 50/46* (2013.01)

(58) Field of Classification Search
CPC ................................. B64D 11/0696
See application file for complete search history.

(56) References Cited

U.S. PATENT DOCUMENTS 7,618,009 B2 11/2009 Glockler
7,837,146 B2 11/2010 Bauer
(Continued)

FOREIGN PATENT DOCUMENTS

DE 10 2004 013 878 A1 10/2005
DE 10 2005 042 403 B3 5/2007
(Continued)

OTHER PUBLICATIONS

First Office Action from corresponding German Patent Application No. 10 2013 219 616.4, dated May 16, 2014, in which references F1, F2, F3, and F5 were in the German Patent Office.

*Primary Examiner* — Philip J Bonzell
*Assistant Examiner* — Michael B. Kreiner
(74) *Attorney, Agent, or Firm* — Saliwanchik, Lloyd & Eisenschenk

(57) ABSTRACT

The invention relates to a floor attachment assembly for mechanically connecting two aircraft seats to a floor structure of an aircraft, which assembly comprises four attachment points. The floor attachment assembly can be attached to the floor structure by means of one attachment element in each case at the four attachment points. The floor attachment assembly comprises two adapter plates, the two adapter plates being interconnected by means of a connection element. The mechanical connection between at least one of the adapter plates and at least one of the attachment elements is movable along at least one axis. Furthermore, the invention relates to a corresponding aircraft seat.

19 Claims, 3 Drawing Sheets

(56) References Cited

U.S. PATENT DOCUMENTS

| | | | |
|---|---|---|---|
| 7,857,259 B2 | 12/2010 | Baatz et al. | |
| 8,459,742 B2 | 6/2013 | Saint-Jalmes et al. | |
| 9,796,296 B2* | 10/2017 | Cailleteau | B60N 2/01 |
| 2010/0314494 A1* | 12/2010 | Gasser | B64C 1/20 |
| | | | 244/131 |
| 2011/0068226 A1* | 3/2011 | Baatz | B64C 1/20 |
| | | | 244/118.6 |
| 2015/0115101 A1* | 4/2015 | Thomaschewski | B64D 11/0696 |
| | | | 244/118.6 |
| 2015/0151840 A1* | 6/2015 | Thomaschewski | B60N 2/4221 |
| | | | 297/216.19 |
| 2015/0202992 A1* | 7/2015 | Cailleteau | B60N 2/015 |
| | | | 297/248 |

FOREIGN PATENT DOCUMENTS

| | | |
|---|---|---|
| EP | 0 968 916 A2 | 1/2000 |
| EP | 1 892 185 A1 | 2/2008 |
| EP | 2 481 632 A1 | 8/2012 |
| FR | 2 920 011 | 2/2009 |

* cited by examiner

FLOOR ATTACHMENT ASSEMBLY AND AIRCRAFT SEAT

CROSS REFERENCE TO A RELATED APPLICATION

This application is a National Stage Application of International Application Number PCT/EP2014/070609, filed Sep. 26, 2014; which claims priority to German Patent Application No. 10 2013 219 616.4, filed Sep. 27, 2013; both of which are incorporated herein by reference in their entirety.

The invention relates to a floor attachment assembly for mechanically connecting two aircraft seats to a floor structure of an aircraft. Furthermore, the invention relates to a corresponding aircraft seat.

Aircraft seats for passenger cabins are typically attached to the floor structure of the aircraft. Here, said seats can be attached to the floor structure on seat rails or at individual attachment points. The seat substructure is typically a metal frame having a framework structure.

For safe use of an aircraft seat in air transport operation, various aviation regulations are provided by the relevant authorities which are intended to ensure the safety of the passenger in the aircraft seat in various situations and possible accident scenarios.

In the event of a crash, it is required that the dynamic occupant load of a passenger sitting in the aircraft seat does not exceed certain limit values under specified conditions. For this, it is necessary for the aircraft seat to provide the possibility of limiting the forces acting on the passenger by absorbing kinetic energy. The seat substructure of standard aircraft seats therefore comprises a metal structure which plastically deforms in the event of a crash, accordingly absorbs kinetic energy and thus limits the forces acting on the passenger.

In this case, the plastic deformation is distributed over the entire seat substructure. This means that the mechanical structures that bear the load are deformed and thus limit the forces acting on the passenger. The deformation also leads to an altered geometry and force transmission, and this has to be taken into account by means of corresponding reserves of strength when designing the aircraft seat. This has a negative effect on the weight of the aircraft seat.

In the event of a translational crash, the deformation leads, inter alia, to a rotational movement of the majority of the seat about a virtual point of rotation in the vicinity of the cabin floor. Because of the position of the resulting virtual point of rotation, this leads to considerable translational movement in the upper region of the seat, which occurs in addition to the translational movement required for energy absorption. In the event of a crash, this therefore leads to a large movement envelope for the aircraft seat and thus also for the occupant, and therefore the movement envelope, in the form of movement space, has to be kept free of other installations.

Use of a simple reinforcement of the structure for the seat substructure, so as to reduce rotation in the event of a translational crash, conflicts with the safety requirement of force limitation for the passenger.

In particular, one of the official requirements for aircraft seats is that in the event of a crash, pre-deformation of the aircraft floor is to be anticipated and has to be absorbed or withstood by the seat substructure. The seat substructures therefore have to have mechanical resilience specifically in the lower region so as to be able to follow the deflections in the aircraft floor structure. This is counter to a small rotational movement of the aircraft seat and to the desired small movement envelope. Seat substructures which have rigid structures but which merely allow a small amount of deformation therefore cannot be implemented using the solution known in the prior art.

Furthermore, as a result of the pre-deformation of the floor structure, deformation of the seat substructure takes place together with large strains and an altered geometry, leading to weakening of the seat substructure, the actual crash situation only occurring thereafter with high dynamic loads.

In addition, the potential force introduction is evenly limited at the attachment points, e.g. on a seat rail. Therefore, local overloads at individual points or attachment points are intended to be prevented. This should be taken into consideration in particular for double seats or seat groups, since here the corresponding increased number of persons multiplies the loads that occur, while the number of load-introduction points and attachment points remain the same. Such load limits of the attachment points are for example significant for VIP installations in aircraft cabins, since the seat rails of an aircraft are generally designed for typical multiple-class seating. The installation of double seats or seat groups having a plurality of seats that are arranged directly side by side is therefore not provided at every point in the cabin. The mechanical reserves of seat rails can therefore be limited in the front cabin region of an aircraft, for example. Furthermore, owing to the usual distances between seat rails or the available attachment points in a cabin of an aircraft, it is advantageous for two aircraft seats to have a shared connection to the floor structure of the aircraft.

The problem addressed by the invention is to provide a floor attachment assembly which makes the use of a rigid seat substructure possible for two aircraft seats.

BRIEF SUMMARY

A floor attachment assembly for mechanically connecting two aircraft seats to a floor structure of an aircraft is proposed, which assembly comprises four attachment points, it being possible to attach the floor attachment assembly to the floor structure by means of one attachment element in each case at the four attachment points. According to the invention, the floor attachment assembly comprises two adapter plates, the two adapter plates being interconnected by means of a connection element. The mechanical connection between at least one of the adapter plates and at least one of the attachment elements is movable and/or rotatable along at least one axis.

The adapter plates and the mounting thereof to the attachment elements, which have the mechanical connection to the stationary attachment points of the floor structure, lead to pre-deformation of the floor structure of the aircraft substantially not transmitting any forces to the adapter plates.

Owing to the movability or rotatability of an attachment element relative to an adapter plate along at least one axis, in terms of the stability of the adapter plates, it is possible for only small forces to be introduced into the adapter plates at this position along this axis, it being possible to transmit mechanical forces along the other axes. The floor attachment assembly can therefore, overall, transmit forces from the floor structure of the aircraft to other structures of an aircraft seat in all directions by means of the adapter plate, but cannot transmit forces from the individual attachment elements in all directions.

During pre-deformation of the floor structure of the aircraft, the adapter plates of the floor attachment assembly are therefore free of deformations, meaning that structures of an aircraft seat which are fixed to an adapter plate are not affected by pre-deformation of the floor structure of the aircraft. This can make it possible to make the other structures more rigid and/or lighter, and overall this makes a lighter aircraft seat having a rigid seat substructure possible. Furthermore, this makes it possible to arrange force-limiting elements at a comparatively high level in the aircraft seat, meaning that undesired rotation of the aircraft seat about a low point of rotation can be prevented in the event of a crash.

The corresponding arrangement makes it possible for the loads acting on the floor structure at the attachment points to be kept as low as possible. The floor structure during pre-deformation is also subjected to loads or prior damage to a significantly lesser degree due to the corresponding design, and therefore a more secure seat connection of two aircraft seats to the floor structure can be produced overall.

Preferably, by means of the connection element, the two adapter plates can be moved by at least 10 mm relative to one another in parallel with a transverse axis.

The movability between the adapter plate and at least one attachment element is preferably limited. The limitation of the movability defines the tolerance range in which pre-deformation of the floor structure can be absorbed by the floor attachment assembly.

The movability of the adapter plates relative to one another provides the possibility of pre-deformation of the floor structure, for example the rotation of a seat rail or of the attachment point in general, making possible a corresponding slight movement of the adapter plates and the aircraft seats connected thereto relative to one another, without large loads being introduced into the adapter plate itself and thus into the seat substructure as a result. The adapter plates can either be moved towards one another or away from one another in this case. Following a corresponding pre-deformation of the floor structure, the seat distance may thus have changed to a certain extent. However, in this state, the adapter plates, the seat substructures and the aircraft seats themselves remain unaffected or without pre-deformation and are therefore available with an intact and undeformed structure to transmit and limit the forces acting on a seated passenger in the event of a subsequent crash.

Preferably, by means of the connection element, the two adapter plates are connected to one another in a torque-free manner on the transverse axis or a line that is parallel to the transverse axis.

The torque-free connection between the two adapter plates on a corresponding transverse axis by means of the connection element makes it possible for the two adapter plates to rotate relative to one another, and therefore the adapter plates and the entire floor attachment assembly remain largely free of forces during pre-deformation of the floor structure, meaning that the floor attachment assembly is available for absorbing loads in the event of a crash without having sustained any mechanical damage. Weakening of the mechanical strength by pre-deformation of the floor structure can be prevented in this way.

In preferred embodiments, a front attachment element and a rear attachment element are in each case arranged on two axes that are parallel to a longitudinal axis, the front attachment elements being arranged in each case on an axis that is parallel to a transverse axis and/or the rear attachment elements being arranged in each case on a further axis that is parallel to a transverse axis, the longitudinal axis and the transverse axis being at right angles to one another.

The longitudinal axis is preferably oriented in parallel with the direction of flight of an aircraft, the transverse axis that is at a right angle thereto spanning a plane together with the longitudinal axis which is preferably in the plane of the cabin floor or of the floor structure or is parallel thereto. Such a plane may also be referred to as a floor plane.

The above-described type of mounting is well suited to almost force-free mounting of the adapter plates during pre-deformation of the cabin floor. In particular, this type of mounting is also advantageously suitable for use on two parallel seat rails on the floor structure of the aircraft. Furthermore, the mounting is preferably symmetrical to the longitudinal axis, which extends substantially in parallel with the main extension direction of the aircraft in conventional embodiments.

Preferably, the front attachment elements can each be moved by at least 20 mm in both directions in parallel with the longitudinal axis, can each be moved by at least 3 mm in both directions in parallel with the transverse axis and are fixed in parallel with a vertical axis, the rear attachment elements being fixed in parallel with the longitudinal axis, being fixed in parallel with the transverse axis and being fixed in parallel with the vertical axis.

Using such a configuration of the degrees of freedom, a seat substructure of an aircraft seat can be kept free of forces during pre-deformation of the floor structure, so that a rigid seat substructure can be used. In particular, such a configuration is suitable for obtaining a high tolerance range in terms of the position of a possible point of rotation about which a seat rail can rotate during pre-deformation of the floor structure.

Each of the two adapter plates comprises two attachment elements which establish the mechanical connection to the floor structure, for example a seat rail. An adapter plate is fixed in position in each case by means of both the other adapter plate and the two attachment elements so that the adapter plates are mutually supported in the region of the connection element. The connection element is preferably located between the two rear attachment elements. Furthermore, the connection element is preferably in the region of an imaginary connecting line between the two rear attachment elements.

In advantageous embodiments, at least one connection of the adapter plate to an attachment element and/or the connection element between the adapter plates has a deformation region which is provided to make movement possible in at least one direction by plastic deformation.

The plastic deformation of the deformation region may take place in a structural part between an attachment element and the adapter plate. Furthermore, the plastic deformation between the adapter plates may be achieved by a deformation region of the connection element. The plastic deformability in at least one direction preferably makes it possible to transmit forces in the other directions. A deformation region is advantageous because it makes the required movement between the attachment element and the adapter plate in the corresponding direction possible only when corresponding forces occur, and is therefore easy to handle during assembly. The corresponding forces are preferably selected here such that standard use during flight operation does not cause any plastic deformation of the deformation region, whereas the plastic deformation of the deformation region takes place long before possible plastic deformation of or damage to the adapter plates. Furthermore, in this way the corresponding movability can be achieved both at a low structural weight and cost-effectively. A direction of the plastic deformation may also include a rotation.

A connection of this type may also be referred to as a plastic hinge, the plasticity relating to the provided mechanical deformability above a yield point of the material in the deformation region of the connection.

The corresponding deformation region can further reduce shocks in the event of a crash by absorbing energy, and this may be advantageous for the occupant loads and seat structure loads.

Preferably, the mechanical connection between one adapter plate and at least one attachment element or the connection element between the adapter plates comprises an elastomer bearing and/or a bearing having a sliding fit.

An elastomer bearing makes torque-free mounting possible and can additionally reduce the transmission of vibrations and structure-borne noise between the floor structure and the floor attachment assembly during normal operation, which may increase comfort for the passenger.

The mechanical connection between the adapter plate and at least one attachment element advantageously has a sliding fit. The mechanical bearing having a sliding fit is an advantageous embodiment for making movement possible at least in one direction in the bearing. Forces perpendicular to the movability can be transmitted by a bearing having a sliding fit. Furthermore, there is the option of simultaneous torque-free mounting along an axis of rotation.

The adapter plates of the floor attachment assembly can preferably be mounted such that the attachment points can deflect by up to 200 mm out of their original position without deformation. Deformation-free mounting of this type defines a tolerance zone, and restricts the possible pre-deformation of the floor structure. In this region, the adapter plates preferably do not undergo any prior damage, so that the adapter plates and structures attached thereto withstand corresponding pre-deformation of the floor structure without deforming, for example without fracturing and without plastic deformation.

Preferably, in each case two of the attachment elements can be attached to two attachment points on a seat rail, the floor attachment assembly being mounted such that rotation of a seat rail by at least 10° about a point of rotation positioned within the seat rail and within a 1 m radius of the geometric central point of the floor attachment assembly does not bring about irreversible deformation of the adapter plates.

Mounting of this type is well suited to the use of a rigid seat substructure, since virtually no pre-deformation of the floor structure itself has to be absorbed by the seat substructure, and this in particular makes the use of lightweight fibre composite materials possible which may lose a significant amount of their load-bearing capacity after deformation involving high strains.

In a preferred embodiment, a connection point for a seat substructure is provided on at least one of the adapter plates. The connection point makes mechanical connection to the seat substructure possible, preferably using a releasable connection by way of means such as screws, bolts and/or threaded bushings.

Furthermore, in an advantageous embodiment a seat substructure can be moved in translation and/or in rotation in a floor plane on the floor attachment assembly. The translational movability of a seat substructure on the floor attachment assembly is advantageous for use of an aircraft seat in order to be able to move the aircraft seat in the cabin if required, for example towards or away from a table. Rotational movability of the seat substructure on the floor attachment assembly makes it possible to change the seat orientation, and this can increase the flexibility of use of the aircraft seat.

In an alternative advantageous embodiment, the adapter plate is an integral component, together with a seat substructure. The proposed embodiment makes light and rigid connection of a seat substructure to the floor attachment assembly possible. Furthermore, the number of parts is reduced as a result of the integral construction and better transmission of forces is made possible.

The adapter plate is preferably a fibre composite component. The embodiment of the adapter plate as a fibre composite component having for example a proportion of carbon fibres in the structural weight makes high rigidity possible at a low weight, whilst as a result of the floor attachment assembly according to the invention, the adapter plate does not have to follow any deformations from the floor structure, and this improves the applicability of fibre composite structures.

Furthermore, the adapter plate preferably has a sandwich structure. This makes a very light and above all flexurally rigid adapter plate possible.

In possible advantageous embodiments, all the attachment elements have a substantially torque-free mechanical connection to the adapter plate. This improves the decoupling of the pre-deformation of the floor structure from the adapter plate, so that the adapter plate can transmit all mechanical loads which occur between the aircraft seat and the floor structure in normal operation and in the event of a crash, but does not undergo any deformation during corresponding pre-deformation of the floor structure.

In an advantageous embodiment, the mechanical connection between the adapter plate and at least one attachment element may be a ball-head mounting. A ball-head mounting is an advantageous embodiment for achieving torque-free mounting of the floor attachment assembly.

The problem addressed by the invention is furthermore solved, proceeding from the preamble of the final claim, by the characterising features thereof. An aircraft seat is proposed, a corresponding floor attachment assembly being provided. In addition to being connected to another aircraft seat, an aircraft seat can thus advantageously be connected to a floor structure of an aircraft by means of the floor attachment assembly. This may also be advantageous for assembling and disassembling the aircraft seat.

BRIEF DESCRIPTION OF THE DRAWINGS

In the following, the invention will be described on the basis of preferred embodiments and with reference to the accompanying drawings, in which.

DETAILED DESCRIPTION

Figure 1:
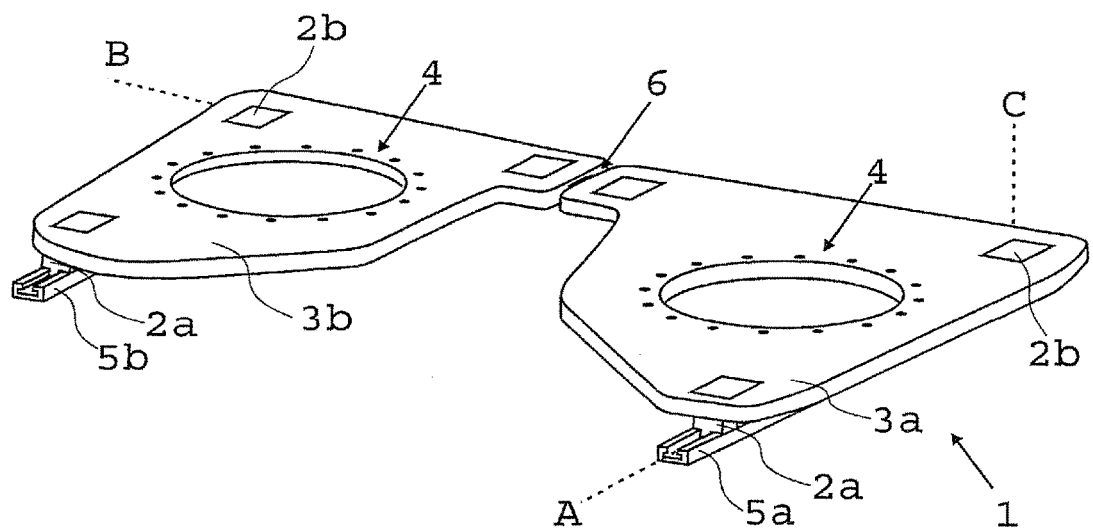
FIG. 1 shows a floor attachment assembly on two seat rails.

FIG. 1 shows an advantageous embodiment of a floor attachment assembly 1 comprising two adapter plates 3a, 3b. The two adapter plates 3a, 3b each have connection points 4 for a seat substructure 10 (see FIG. 5). The seat substructure 10 may form a platform on which further assemblies of an aircraft seat 8 (see FIG. 5) may be arranged.

The floor attachment assembly 1 can be attached to the floor structure of an aircraft by means of attachments elements 2a, 2b. The floor structure of the aircraft is the mechanical structure in the aircraft for absorbing the mechanical loads acting on the cabin floor. In this embodiment, the floor structure comprises two seat rails 5a, 5b, which each comprise a plurality of possible attachment points along the main axes thereof. In this embodiment, the main axes of the seat rails 5a, 5b are parallel to a longitudinal axis A.

The four attachment elements 2a, 2b of the floor attachment assembly 1 are arranged on the seat rails 5a, 5b at four attachment points so as to be stationary, two of the attachment elements 2a, 2b being arranged on one of the seat rails 5a or 5b in each case. The attachment elements 2a, 2b may for example be screwed, clamped and/or otherwise mechanically connected to the seat rail 5a, 5b at an attachment point, in order to make transmission of forces possible between the floor structure, via the seat rail 5a, 5b, and the floor attachment assembly 1, via the attachment element 2a, 2b.

The attachment elements 2a, 2b may constitute an immovable connection to the floor structure here. The front attachment elements 2a are the only attachment elements 2a that are visible in this figure. The rear attachment elements 2b are covered by parts of the adapter plates 3a, 3b, such that the rear attachment elements 2b are only indicated in FIG. 1 in accordance with their position.

The adapter plates 3a, 3b are substantially planar structures, which are mostly arranged between the attachment elements 2a, 2b. Here, the adapter plates 3a, 3b are designed to be as dimensionally stable and rigid as possible so as to make transmission of mechanical, in particular dynamic, loads possible between the connection points 4 and the floor structure, largely without deformation. In a preferred embodiment, the adapter plates 3a, 3b may have a carbon-fibre-reinforced structure. Furthermore, the adapter plates 3a, 3b may also have a sandwich construction, in which mechanical foams and/or honeycomb structures are used, for example. This should make an overall very rigid and simultaneously lightweight structure possible for the adapter plates 3a, 3b. The connection points 4 for a seat substructure 10 may be metal inserts, which make screwing and/or bolting possible and may be integrated into the adapter plates 3a, 3b.

The adapter plates 3a, 3b may be oriented substantially in parallel with the floor plane of the aircraft cabin. In advantageous embodiments, the adapter plates 3a, 3b are arranged above the floor plane of the aircraft cabin, which serves as a walking surface for passengers. In possible alternative embodiments, the adapter plates 3a, 3b may be arranged such that the floor plane is positioned within or at the boundaries of the adapter plates 3a, 3b. As a further alternative, the adapter plates 3a, 3b may be arranged below the floor plane.

In a possible embodiment, various recesses and/or cut-outs may be provided in the adapter plates 3a, 3b, making a reduced-weight adapter plate 3a, 3b possible.

The individual adapter plates 3a, 3b are designed to be connected to the seat rails 5a, 5b at two attachment points by means of two attachment elements 2a, 2b. In a preferred embodiment, the mechanical connection between at least one attachment element 2a, 2b and an adapter plate 3a, 3b is movable. In this context, movable means that the mechanical connection does not transmit any significant forces along the axis of the movability, and relative movement between the attachment element 2a, 2b and the adapter plate 3a, 3b is possible along this axis. In this context, movability along an axis means still no movability in the directions of the other axes, such that forces can still be transmitted in these directions.

The movability of the mechanical connection between the attachment element 2a, 2b and an adapter plate 3a, 3b is preferably not used for translational movement of the aircraft seat 8 relative to the floor structure, but instead for the described largely force-free relative movement within the floor attachment assembly 1 in the event of deformation of the floor structure. A translational movement, for example so as to be able to move the aircraft seat 8 towards a table 7 (see FIG. 3), may for example be implemented by way of a relative movement between the floor attachment assembly 1 and the seat substructure 10 and/or by way of a relative movement between the seat substructure 10 and a seat surface.

In a further possible embodiment, the mechanical connection between one or more attachment elements 2a, 2b and an adapter plate 3a, 3b is formed by elastomer bearings, as a result of which substantially torque-free mounting is implemented at this point. Elastomer bearings comprise a connection of two parts which are movable with respect to one another, the relative movability being achieved by way of a resilient material arranged between the two parts.

Furthermore, the mechanical connection may have structurally intended plastic deformability, as a result of which displacement in a direction can be achieved by way of a corresponding force acting in this direction, force and/or torque transmission in other directions also being possible. In this case, the plastic deformation advantageously already occurs before the force and/or torque action brings about deformation of the adapter plates 3a, 3b.

Figure 2:
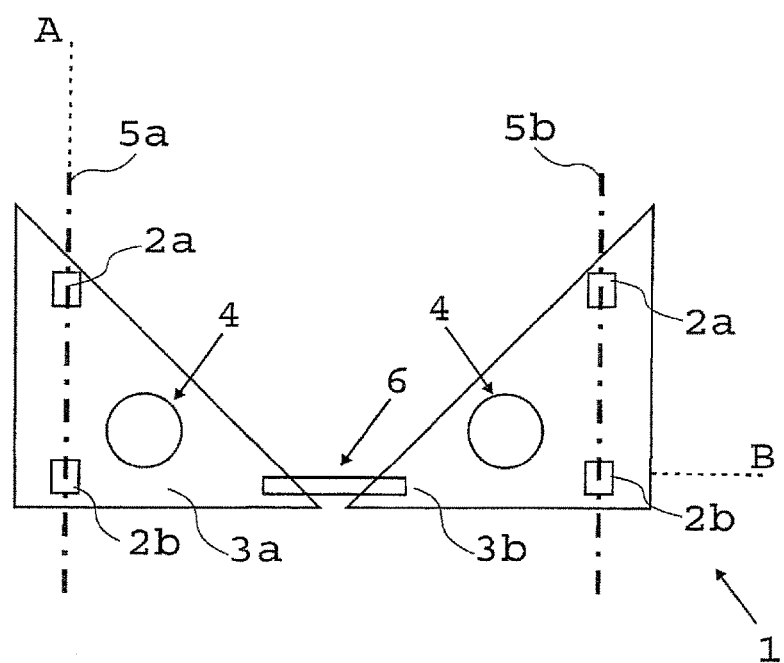
FIG. 2 is a schematic view of a floor attachment assembly.

FIG. 2 is a schematic plan view of the floor attachment assembly 1. The attachment elements 2a, 2b of the adapter plate 3a, which are positioned on two attachment points of the seat rail 5a, allow certain force and/or torque transmissions between the seat rail 5a and the adapter plate 3a. The front attachment element 2a and the rear attachment element 2b are both arranged on the seat rail 5a, so that these are arranged on a common axis which extends in parallel with or along the longitudinal axis A. The longitudinal axis A generally corresponds to the main extension direction of the aircraft cabin or the flight direction.

The movability may in particular be achieved in the front attachment element 2a and in parallel with the longitudinal axis A by way of a movable mechanical connection between the front attachment element 2a and the adapter plate 3a or by way of movability of the front attachment element 2a in the seat rail 5a.

The front attachment element 2a is preferably arranged at the front of the floor attachment assembly 1 in the seating direction. In parallel with the transverse axis B, the front attachment element 2a preferably has a movable connection to the adapter plate 3a. Furthermore, preferably no movability is provided in the direction of a vertical axis C, which is preferably perpendicular to the longitudinal axis A and the transverse axis B. In preferred embodiments, the front attachment element 2a has no rotational degrees of freedom.

In this advantageous embodiment, a rear attachment element 2b of the adapter plate 3a is attached to the same seat rail 5a. In advantageous embodiments, the rear attachment element 2b has no rotational and no translational degrees of freedom with respect to the seat rail 5a and with respect to the adapter plate 3a.

The other adapter plate 3b of the floor attachment assembly 1 is preferably designed to be symmetrical to the adapter plate 3a. The two adapter plates 3a, 3b are mechanically interconnected by means of a connection element 6. The connection element 6 may for example comprise a flexurally rigid rod which is arranged in corresponding openings in the adapter plates 3a, 3b. In advantageous embodiments, the connection element 6 allows movability of the adapter plates 3a, 3b relative to one another by at least 20 mm from a normal position along the transverse axis B.

In addition, the connection element 6 preferably allows torque-free mounting on the transverse axis B of the adapter plates 3a, 3b, so that it is possible to rotate the adapter plate 3a relative to the adapter plate 3b when there is corresponding pre-deformation of the floor structure or to rotate the seat rail 5a, 5b about the transverse axis B.

Torque-free mounting of the adapter plates 3a, 3b relative to one another by means of the connection element 6 on the transverse axis B or a line that is parallel to the transverse axis B makes it possible for the adapter plates 3a, 3b to remain free of forces during deformation or pre-deformation of the floor structure, so that the entire mechanical strength of the floor attachment assembly 1 is available for absorbing the crash loads in the event of a subsequent crash.

The torque-free mounting is carried out by means of the connection element 6, which preferably makes it possible to move the adapter plates 3a, 3b relative to one another in parallel with a transverse axis and makes rotation possible about the axis of movability.

The torque-free mounting of the connection element 6 on an axis does not preclude additional means being provided which block torque-free mounting of the two adapter plates 3a, 3b relative to one another to the extent that normal handling forces or torques, for example during assembly, can be absorbed. In advantageous embodiments, the torque-free mounting is only blocked until a higher load level is reached, which may result from pre-deformation of the floor structure or in the event of crash. If a corresponding load level is exceeded, such blocking is permanently released by the additional means. This may take place by means of a shear pin, for example. Such blocking of the torque-free mounting of the two adapter plates 3a, 3b relative to one another may allow simplified assembly and may prevent rattling noises due to tolerances in the torque-free mounting.

Similarly, in further embodiments the movability of the two adapter plates 3a, 3b relative to one another in parallel with a transverse axis may be blocked by additional means, such as a shear pin, under normal handling and operational forces which do not correspond to pre-deformation of the floor structure or a crash, in order to prevent rattling noises due to the movability in the mounting and corresponding tolerances due to the connection element 6, for example.

Rotation of a seat rail 5a, 5b about the longitudinal axis A or about an axis of rotation located in the vicinity thereof can be compensated during pre-deformation, preferably by a translational compensation movement of the two adapter plates 3a, 3b relative to one another.

Figure 3:
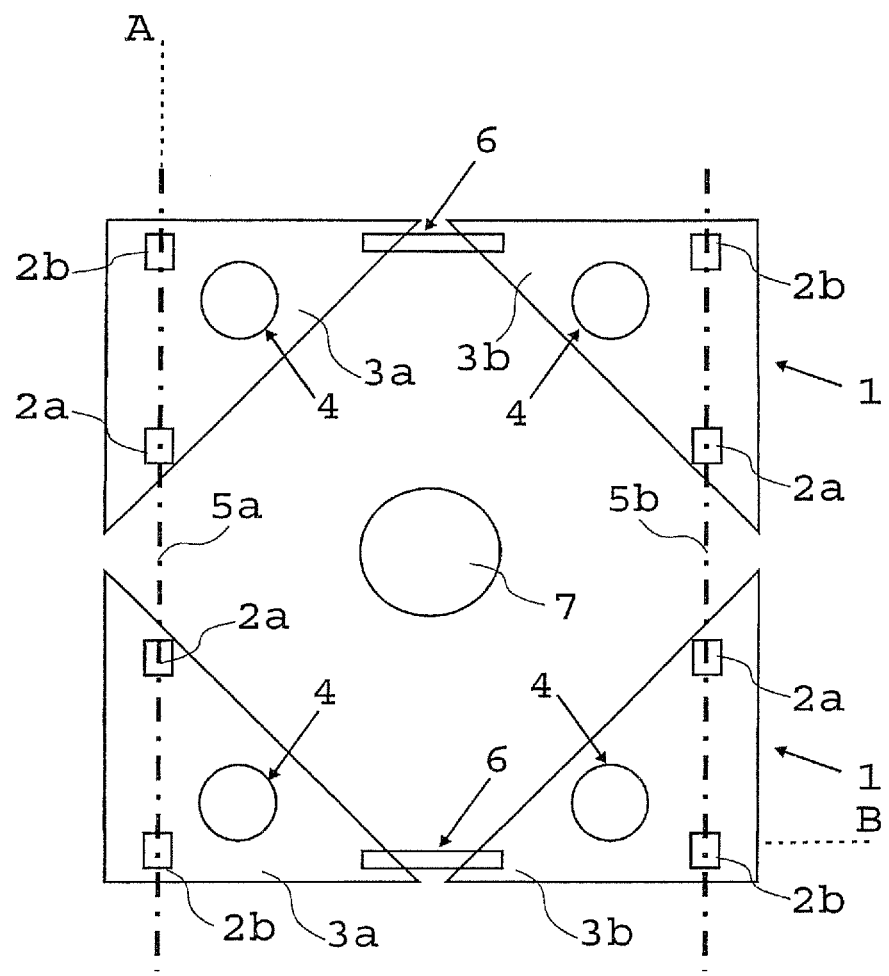
FIG. 3 is a schematic view of a floor attachment assembly in a four-seat arrangement.

FIG. 3 is a schematic plan view of an arrangement of two floor attachment assemblies 1 on two seat rails 5a, 5b. The two floor attachment assemblies 1 each comprise two adapter plates 3a, 3a, which each comprise connection points 4 for an aircraft seat 8. In this embodiment, four aircraft seats 8 may therefore be arranged on the two seat rails 5a, 5b.

The floor attachment assembly 1 shown at the top of FIG. 3 is oriented counter to the floor attachment assembly 1 shown at the bottom along the longitudinal axis A. Accordingly, one floor attachment assembly 1 is preferably oriented in the direction of flight and one floor attachment assembly 1 counter to the direction of flight. Accordingly, the front attachment elements 2a of the two floor attachment assemblies 1 are arranged on the seat rails 5a, 5b so as to face one another. In this embodiment, a four-seat arrangement of aircraft seats 8 having two corresponding floor attachment assemblies 1 can therefore be produced in a simple manner, it being possible for two aircraft seats 8 to face one another in each case. Such an arrangement is also known as a "club four" arrangement. Using corresponding floor attachment assemblies 1, a table 7, which is shown schematically in FIG. 3 as a central table leg, can also be advantageously arranged between two double seats which face one another.

In further embodiments, during the installation or assembly of the floor attachment assembly 1, a parallel offset of the adapter plates 3a, 3b and/or of the four connection points 4 with respect to the seat rails 5a, 5b can be set. As a result, the aircraft seat 8 can be arranged in various positions transversely to the direction of flight of the aircraft whilst being attached to the same attachment points of the floor structure, and this increases the cabin configuration options. The position of the central line or line of symmetry of the aircraft seats 8 is advantageously set between the seat rails 5a, 5b. This setting typically requires an assembly process and is to be considered separate from a possible translational movement of the aircraft seat 8 which can be carried out by a passenger, for example. In a possible embodiment, the position of the aircraft seat 8 can be set transversely to the direction of flight, for example along the transverse axis B by selecting the length of the mechanical connection between an adapter plate 3a, 3b and the attachment elements 2a, 2b.

Figure 4:
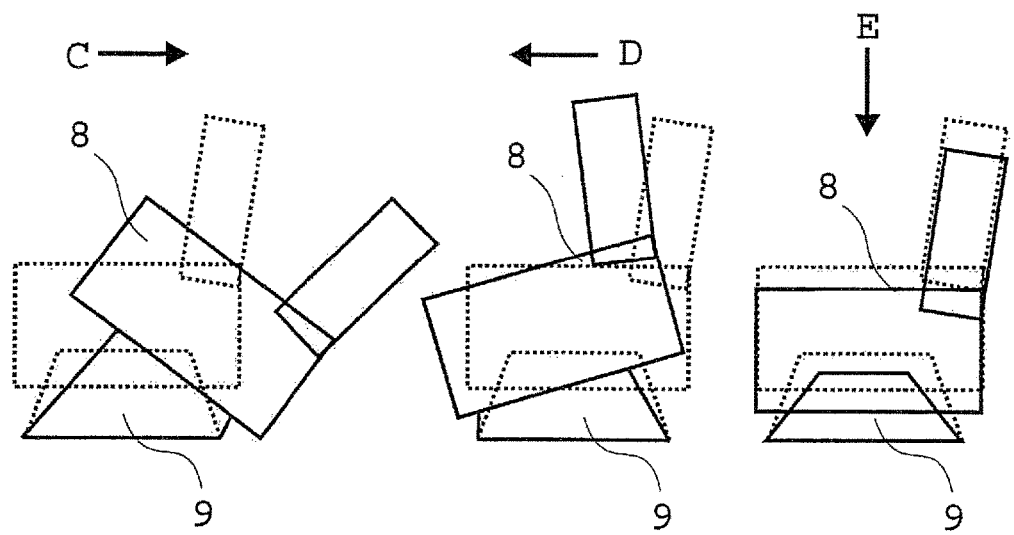
FIG. 4 shows an aircraft seat from the prior art.

FIG. 4 shows a prior-art aircraft seat 8 comprising a seat frame 9. The prior-art aircraft seat 8 is shown together with the deformation behaviour thereof after three possible crash events having different acceleration directions C, D, E of the centre of gravity of a seated passenger (not shown in FIG. 4).

The seat frame 9 is accordingly configured to be plastically deformable for absorbing the pre-deformation. This applies in particular to the lower part. This side view does not show pre-deformation of the floor structure of the aircraft. The seat frame 9 absorbs the loads as well as the pre-deformation in the event of a crash having high accelerations. The limitation of the forces acting on a seated passenger is achieved by way of the flexible structure of the seat frame 9. Overall, a comparatively large deformation sets in in the lower region of the aircraft seat 8, and leads to rotation of the aircraft seat 8, the point of rotation being low with respect to the seat surface of the aircraft seat 8, and this leads to large deflections in the upper region of the aircraft seat 8.

The deflection in the event of a crash defines the movement envelope of the aircraft seat 8 and of the seated passenger, which has to be kept free of articles and/or objects in the cabin of the aircraft to prevent injuries. In the prior art, there is a correspondingly large movement envelope. A more rigid design of the seat frame 9 is not possible in the prior art because of the necessary absorption of pre-deformations of the floor structure of the aircraft by the seat frame 9 and the required force limitation for the passenger by absorbing kinetic energy in the event of a crash.

Alternatively, there is the option of keeping the free space around the passenger sufficiently small that the path to the boundary of the free space, for example a table 7 or another aircraft seat 8, is sufficiently short in the event of a crash that no significant relative speeds between the passenger and adjacent parts can occur before a collision. However, this leads to considerable losses of comfort during normal operation. Furthermore, cushioning of the corresponding parts may nevertheless become necessary, and this is impractical for example for a table surface.

Figure 5:
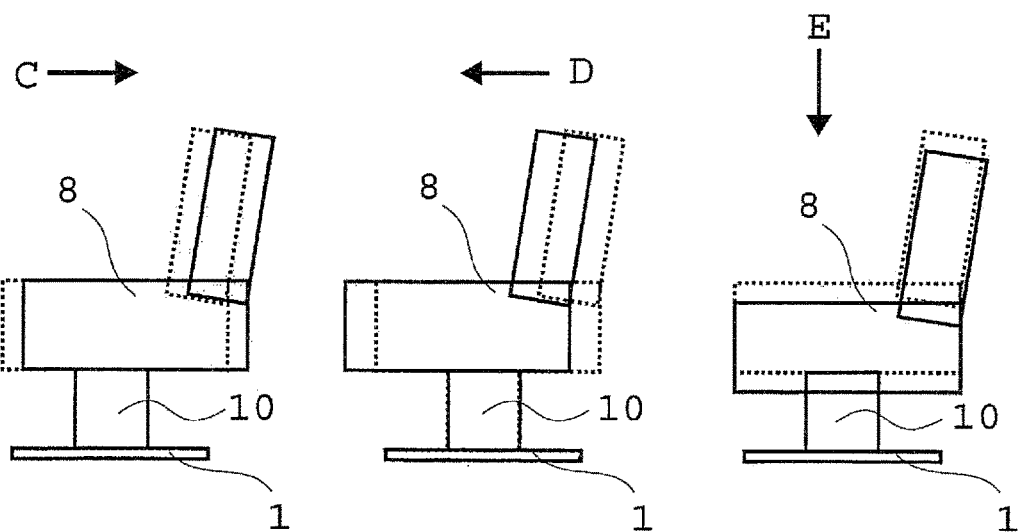
FIG. 5 shows an aircraft seat comprising a floor attachment assembly and a rigid seat substructure.

FIG. 5 shows three aircraft seats 8 comprising an embodiment of a floor attachment assembly 1, which undergo the same accelerations from different crash events as the aircraft seats in FIG. 4. The floor attachment assembly 1 does not pass pre-deformations of the floor structure of the aircraft to the seat substructure 10. Therefore, the seat substructure 10 does not have to be able to absorb deformations, and can be designed to be very rigid. Furthermore, the use of light and rigid materials having a low deformation potential, such as carbon-fibre-reinforced plastics materials, is made possible, and this can lead to a lighter aircraft seat 8. The rigid design of the seat substructure 10 has various advantages in the event of a crash; for example, a rotational movement of the aircraft seat 8 can be largely suppressed in the event of a crash in acceleration directions in the floor plane C, D and/or the energy absorption or force limitation may take place in a targeted manner above the seat substructure 10, and this makes a small movement envelope and a lower structural load of the aircraft seat 8 possible in the event of a crash.

The aircraft seat structure, which is rigid in particular in the region of the cabin floor, is advantageous in the event of a crash, anticipated after the pre-deformation, having high dynamic loads from the corresponding accelerations due to the crash. A rigid seat substructure 10, which can be connected to the adapter plate 3*a*, 3*b* at the connection points 4, does not undergo any damage and/or negative impact from the pre-deformation of the floor structure. In this way, the load-bearing capacity in particular for dynamic loads is maintained in the event of a crash such that the structure can be configured accordingly precisely, it being possible to exploit this in particular for weight reduction. The loads from the crash event can thus be passed for example as far as a seat surface, backrest and/or seatbelt attachment point, with negligible deformations of the seat substructure 10. The force limitation for protecting the passenger may take place above the seat substructure 10, for example in the transition region to the above-mentioned seat components, which may be in direct contact with an occupant. The force limitation may be implemented by a device which is correspondingly provided and configured for this purpose in this transition region. A resultant rotational movement of the seat can be prevented.

There may be a functional separation in the aircraft seat 8 between absorbing mechanical loads, in particular in the event of a crash, and absorbing pre-deformations of the floor structure. As a result, the force limitation may have a specific design for a crash event.

In a possible embodiment, the floor attachment assembly 1 may be covered with a compensation cover, resulting in an aesthetically pleasing floor configuration.

A preferred application of the floor attachment assembly 1 for two aircraft seats 8, for example also in the form of armchairs or upholstered furnishings, is in the VIP area or special equipment area of aircraft. The floor attachment assembly 1 may furthermore advantageously be used for aircraft seats 8 in high-standard cabin sections of an aircraft, known as first class seats.

In further possible embodiments, the mechanical connection within the floor attachment assembly 1 between the attachment elements 2*a*, 2*b* and the adapter plates 3*a*, 3*b* is substantially torque-free. Substantially torque-free means that the mounting or the mechanical connection is not provided to transmit mechanical torques, so that relative rotation of this mechanical connection is possible. However, small torques may be transmitted during relative rotation, but this does not conflict with substantially torque-free mounting.

The attachment points can be integrated into the aircraft floor at various points since in this embodiment the floor structure does not comprise a seat rail 5*a*, 5*b*.

The invention claimed is:

1. A floor attachment assembly for mechanically connecting two aircraft seats to a floor structure of an aircraft, comprising:
    a first adapter plate;
    a second adapter plate;
    four attachment elements; and
    a connection element,
    wherein the floor attachment assembly is configured to attach to a floor structure of an aircraft having four attachment points, such that:
        the first adapter plate and the second adapter plate are mechanically connected to floor structure of the aircraft, via each attachment element of the four attachment elements being mechanically connected to the first adapter plate or the second adapter plate, and being mechanically connected to a corresponding attachment point of the four attachment points;
        the connection element mechanically interconnects the first adapter plate and the second adapter plate; and
        at least one mechanical connection between a corresponding at least one attachment element of the four attachment elements and the corresponding the first adapter plate or the second adapter plate to which the at least one attachment element of the four attachment elements is mechanically connected to is:
            (i) movable along a first axis;
            (ii) rotatable along a first axis; or
            (iii) movable along a first axis and rotatable along the first axis, and
    wherein at least one mechanical connection of the first adapter plate or the second adapter plate to an attachment element of the four attachment element to which the first adapter plate or the second adapter plate is mechanically connected and/or the mechanical connection between the adapter first plate or the second adapter plate and the connection element has a deformation region that is provided to make movement possible in at least one direction by plastic deformation.

2. The floor attachment assembly according to claim 1, wherein the four attachment elements are:
    a first front attachment element;
    a first rear attachment element;
    a second front attachment element; and
    a second rear attachment element;
    wherein the first front attachment element mechanically connects to the first adapter plate and mechanically connects to a first front attachment point of the floor structure of the aircraft;
    wherein the first rear attachment element mechanically connects to the first adapter plate and mechanically connects to a first rear attachment point of the floor structure of the aircraft;
    wherein the second front attachment element mechanically connects to the second adapter plate and mechanically connects to a second front attachment point of the floor structure of the aircraft; and wherein the second rear attachment element mechanically connects to the second adapter plate and mechanically connects to a second rear attachment point of the floor structure of the aircraft.

3. The floor attachment assembly according to claim 2, wherein the interconnection of the first adapter plate and the second adapter plate via the connection element allows the first adapter plate and the second adapter plate to move by at least 10 mm relative to one another in a direction parallel with a transverse axis, and wherein the transverse axis is perpendicular to the first axis.

4. The floor attachment assembly according to claim 3, wherein the interconnection of the first adapter plate and the second adapter plate via the connection element is torque-free with respect to rotation about the transverse axis.

5. The floor attachment assembly according to claim 2, wherein the movability between the at least one attachment element of the four attachment elements and the corresponding the first adapter plate or the second adapter plate to which the at least one attachment element of the four attachment elements is mechanically connected to is limited.

6. The floor attachment assembly according to claim 2, wherein the first axis is a longitudinal axis, wherein the first front attachment element and the first rear attachment element are arranged on the longitudinal axis, wherein the second front attachment element and the second rear attachment element are arranged on a second axis, wherein the second axis is parallel to the longitudinal axis, and wherein:
  (i) the first front attachment element and the second front attachment element are arranged on a transverse axis that is perpendicular to the longitudinal axis;
  (ii) the first rear attachment element and the second rear attachment element are arranged on a transverse axis that is perpendicular to the longitudinal axis; or
  (iii) the first front attachment element and the second front attachment element are arranged on a transverse axis that is perpendicular to the longitudinal axis, and the first rear attachment element and the second rear attachment element are arranged on a further transverse axis that is parallel to the transverse axis.

7. The floor attachment assembly according to claim 6, wherein the first front attachment element is moveable is by at least 20 mm in both directions parallel with the longitudinal axis, wherein the first front attachment element is moveable is by at least 3 mm in both directions parallel with the transverse axis, wherein the first front attachment element is fixed with respect to both directions along an axis that is perpendicular to both the longitudinal axis and the transverse axis, wherein the first rear attachment element is fixed in both directions parallel with the longitudinal axis, wherein the first rear attachment element is fixed in both directions parallel with the transverse axis, and wherein the first rear attachment element is fixed in both directions parallel with the axis that is perpendicular to both the longitudinal axis and the transverse axis.

8. The floor attachment assembly according to claim 2, wherein the first front attachment element and the first rear attachment element are attached to a first seat rail, wherein the second front attachment element and the second rear attachment element are attached to a second seat rail, and wherein the floor attachment assembly is configured to be mounted such that:
  (i) rotation of the first seat rail by at least 10° about a first point of rotation positioned within the first seat rail and within a 1 m radius of a geometric central point of the floor attachment assembly does not bring about irreversible deformation of the first adapter plate; and
  (ii) rotation of the second seat rail by at least 10° about a second point of rotation positioned within the second seat rail and within a 1 m radius of the geometric central point of the floor attachment assembly does not bring about irreversible deformation of the second adapter plate.

9. The floor attachment assembly according to claim 2, wherein at least one connection point for a corresponding at least one seat substructure is provided on at least one of the first adapter plate and the second adapter plate.

10. The floor attachment assembly according to claim 9, wherein when a corresponding at least one seat substructure is connected to the corresponding at least one connection point, the at least one seat substructure can be moved in translation and/or in rotation in a floor plane on the floor attachment assembly.

11. The floor attachment assembly according to claim 9, wherein at least one of the first adapter plate and the second adapter plate and the corresponding at least one seat substructure is a corresponding at least one integral component.

12. The floor attachment assembly according to claim 1, wherein at least one mechanical connection of the first adapter plate or the second adapter plate to an attachment element of the four attachment element to which the first adapter plate or the second adapter plate is mechanically connected and/or the mechanical connection between the adapter first plate or the second adapter plate and the connection element comprises an elastomer bearing and/or comprises a bearing having a sliding fit.

13. The floor attachment assembly according to claim 1, wherein the first adapter plate and the second adapter plate can be mounted such that the four attachment points can deflect by up to 200 mm out of an original position without deformation of the first adapter plate and the second adapter plate.

14. An aircraft seat, comprising:
a floor attachment assembly according to claim 1.

15. A floor attachment assembly for mechanically connecting two aircraft seats to a floor structure of an aircraft, comprising:
  a first adapter plate;
  a second adapter plate;
  four attachment elements; and
  a connection element,
  wherein the floor attachment assembly is configured to attach to a floor structure of an aircraft having four attachment points, such that:
    the first adapter plate and the second adapter plate are mechanically connected to floor structure of the aircraft, via each attachment element of the four attachment elements being mechanically connected to the first adapter plate or the second adapter plate, and being mechanically connected to a corresponding attachment point of the four attachment points;
the connection element mechanically interconnects the first adapter plate and the second adapter plate; and
at least one mechanical connection between a corresponding at least one attachment element of the four attachment elements and the corresponding the first adapter plate or the second adapter plate to which the at least one attachment element of the four attachment elements is mechanically connected to is:
(i) movable along a first axis;
(ii) rotatable along a first axis; or
(iii) movable along a first axis and rotatable along the first axis,
wherein the four attachment elements are:
a first front attachment element;
a first rear attachment element;
a second front attachment element; and
a second rear attachment element;
wherein the first front attachment element mechanically connects to the first adapter plate and mechanically connects to a first front attachment point of the floor structure of the aircraft;
wherein the first rear attachment element mechanically connects to the first adapter plate and mechanically connects to a first rear attachment point of the floor structure of the aircraft;
wherein the second front attachment element mechanically connects to the second adapter plate and mechanically connects to a second front attachment point of the floor structure of the aircraft;
wherein the second rear attachment element mechanically connects to the second adapter plate and mechanically connects to a second rear attachment point of the floor structure of the aircraft;
wherein the interconnection of the first adapter plate and the second adapter plate via the connection element allows the first adapter plate and the second adapter plate to move by at least 10 mm relative to one another in a direction parallel with a transverse axis; and
wherein the transverse axis is perpendicular to the first axis.

16. The floor attachment assembly according to claim 15, wherein the movability between the at least one attachment element of the four attachment elements and the corresponding the first adapter plate or the second adapter plate to which the at least one attachment element of the four attachment elements is mechanically connected to is limited.

17. The floor attachment assembly according to claim 15, wherein the first axis is a longitudinal axis,
wherein the first front attachment element and the first rear attachment element are arranged on the longitudinal axis,
wherein the second front attachment element and the second rear attachment element are arranged on a second axis,
wherein the second axis is parallel to the longitudinal axis, and
wherein:
(i) the first front attachment element and the second front attachment element are arranged on a transverse axis that is perpendicular to the longitudinal axis;
(ii) the first rear attachment element and the second rear attachment element are arranged on a transverse axis that is perpendicular to the longitudinal axis; or
(iii) the first front attachment element and the second front attachment element are arranged on a transverse axis that is perpendicular to the longitudinal axis, and the first rear attachment element and the second rear attachment element are arranged on a further transverse axis that is parallel to the transverse axis.

18. The floor attachment assembly according to claim 15, wherein the first front attachment element and the first rear attachment element are attached to a first seat rail,
wherein the second front attachment element and the second rear attachment element are attached to a second seat rail, and
wherein the floor attachment assembly is configured to be mounted such that:
(i) rotation of the first seat rail by at least 10° about a first point of rotation positioned within the first seat rail and within a 1 m radius of a geometric central point of the floor attachment assembly does not bring about irreversible deformation of the first adapter plate; and
(ii) rotation of the second seat rail by at least 10° about a second point of rotation positioned within the second seat rail and within a 1 m radius of the geometric central point of the floor attachment assembly does not bring about irreversible deformation of the second adapter plate.

19. The floor attachment assembly according to claim 15, wherein at least one connection point for a corresponding at least one seat substructure is provided on at least one of the first adapter plate and the second adapter plate.

* * * * *